March 6, 1956
L. BUSH
2,737,014
AUXILIARY STEAM ENGINE ATTACHMENT FOR
INTERNAL-COMBUSTION ENGINES
Filed Jan. 24, 1951
2 Sheets-Sheet 1
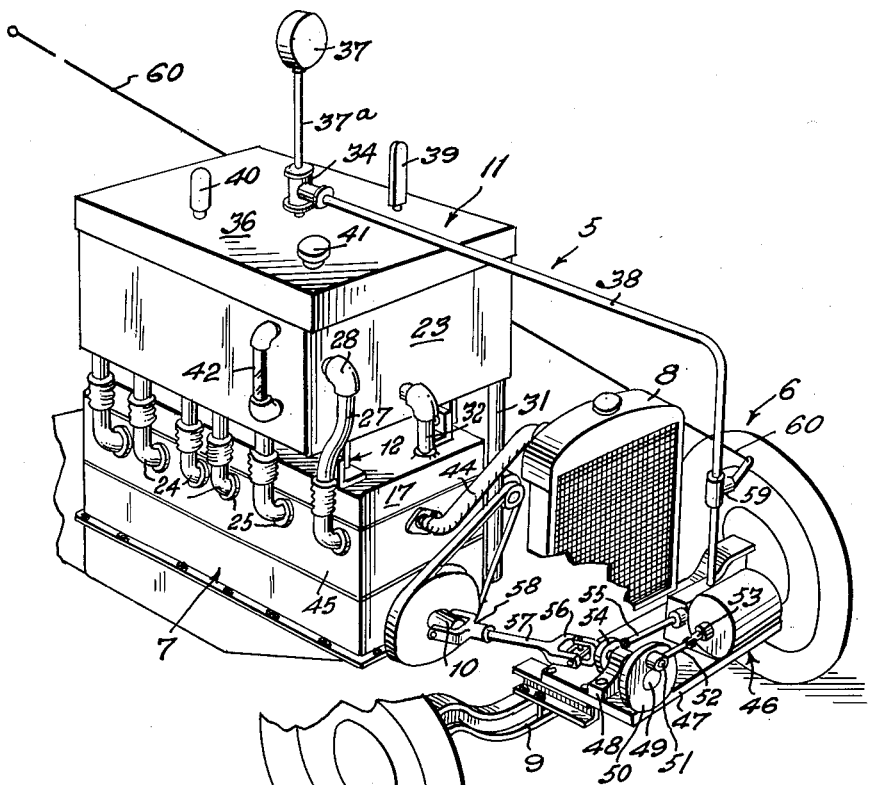
Inventor
*Lee Bush*
By *John N. Randolph*
Attorney March 6, 1956

L. BUSH 2,737,014

AUXILIARY STEAM ENGINE ATTACHMENT FOR
INTERNAL-COMBUSTION ENGINES

Filed Jan. 24, 1951

Inventor

Lee Bush

By John N. Randolph

Attorney ated Mar. 6, 1956

United States Patent Office

2,737,014

AUXILIARY STEAM ENGINE ATTACHMENT FOR INTERNAL-COMBUSTION ENGINES

Lee Bush, Cabot, Pa.

Application January 24, 1951, Serial No. 207,639

3 Claims. (Cl. 60—14)

This invention relates to an auxiliary steam engine attachment for use with internal combustion engines to afford an auxiliary power source for an internal combustion engine drive shaft and which utilizes the wasted heat of the internal combustion engine to generate steam for operating the steam engine which provides the auxiliary power source.

More particularly, it is a primary object of the present invention to provide a steam engine and steam generating unit for use as an attachment to internal combustion engines of trucks whereby the wasted heat of the internal combustion engine will be utilized to generate steam for driving the steam engine to thus afford an auxiliary power source capable of being very effectively utilized in conjunction with the internal combustion engine for providing needed additional power to propel a truck or similar vehicle up grades and which will minimize shifting to low gear for pulling grades and thereby materially decrease the fuel consumption of the internal combustion engine.

Another object of the invention is to provide an auxiliary power source attachment for internal combustion engines which will materially increase the speed at which heavy trucks, equipped with the attachment, may pull grades thereby eliminating the creeping of trucks up hills and thus increasing the average speed of trucks to thus effect a saving in transportation time and costs incident thereto as well as a saving in fuel costs.

Still a further object of the invention is to provide an auxiliary steam power source of extremely simple construction capable of being very economically manufactured, which may be quickly and easily applied to a motor truck and which will effectively function in conjunction with the internal combustion engine thereof to accomplish its intended result.

Numerous other objects and advantages of the invention will hereinafter become more fully apparent from the following description of the drawings, illustrating a presently preferred embodiment thereof, and wherein:

Figure 1 is a fragmentary perspective view of the forward part of a motor truck showing the auxiliary power source applied thereto;

Figure 2 is an end elevational view, partly in transverse vertical section of the same;

Figure 3:
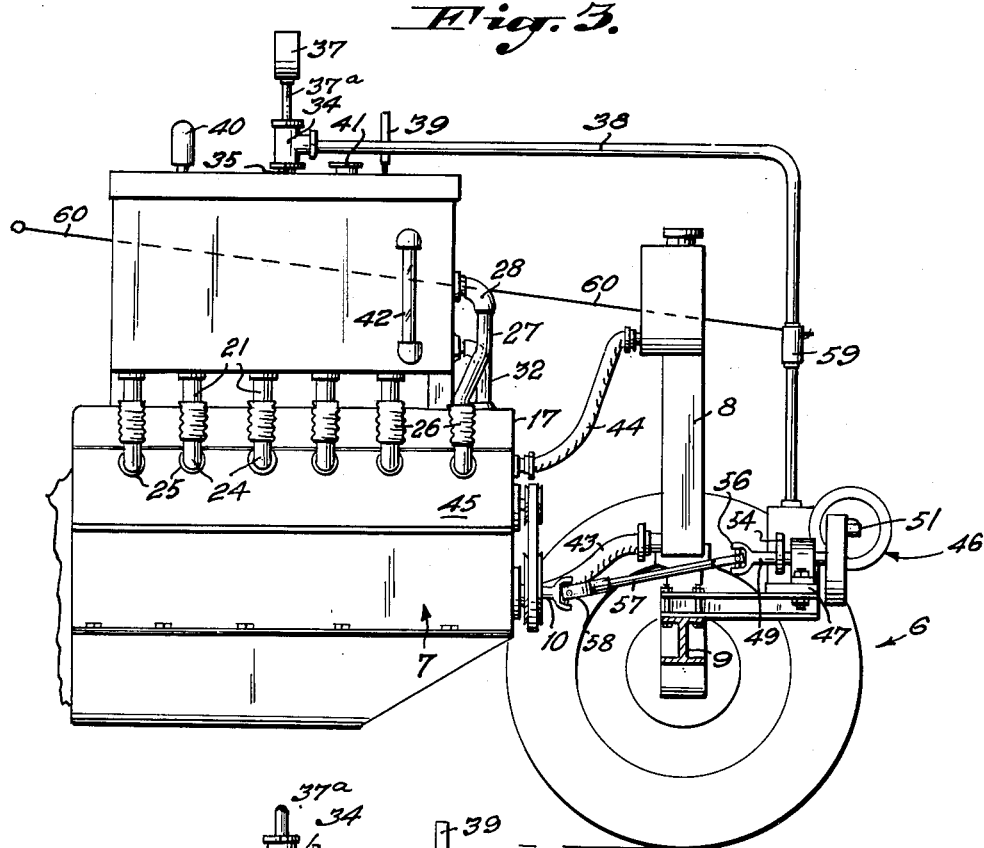
Figure 3 is a fragmentary side elevational view, partly in longitudinal section thereof.

Referring more specifically to the drawings, the auxiliary steam engine attachment, designated generally 5 and comprising the invention, is illustrated in the drawings in a preferred application thereof applied to the internal combustion engine of a truck. A part of the front portion of the truck, designated generally 6, is illustrated in Figures 1 and 3 including the internal combustion engine, designated generally 7, the radiator 8 and the front axle 9, all of which parts are conventional. Likewise, the forward end of the engine crankshaft is illustrated in Figures 1 and 3 at 10.

The auxiliary power source 5 includes a boiler preferably formed of steel and of relatively large capacity, designated generally 11, which is detachably mounted above the engine 7 by a plurality of supporting brackets 12. As best seen in Figure 2, each of the supporting brackets 12 includes an angle member 13 one leg of which is welded or otherwise suitably secured as seen at 14 to the under side or the boiler bottom 15 and the other leg of which is disposed in a depending position. Each bracket 12 also includes a second angle member 16 one leg of which is disposed on and secured to the upper surface of the head 17 of the engine 7 by one of the engine head bolts 18. The other, upstanding leg of the member 16 and the depending leg of the member 13 are detachably secured together by a nut and bolt fastening 19. The boiler 11 is preferably formed of steel plate which is welded and reinforced. If the unit 5 is employed with a six cylinder engine 7, as illustrated, six coils 20, each preferably formed of brass tubing and each extending substantially from side-to-side of the boiler 11 are disposed therein. Five of the six coils 20 have corresponding inlet ends 21 which extend downwardly through the boiler bottom 15 and are suitably sealed as seen at 22 to prevent leakage through the bottom 15 around the tube ends 21. The other tube 20 has an end 21a extending through and similarly sealed in the front wall 23 of the boiler 11.

The exhaust manifold of the engine 7 is dispensed with and in lieu thereof a short L-shaped pipe 24 is connected to each of the six exhaust ports 25 of the engine 7. Each of the pipes 24 have an upstanding upwardly opening discharge end. Five of the pipes 24 terminate beneath the five tube ends 21 and the vertically aligned pipes 24 and tube ends 21 are connected each by a flexible conduit portion 26 the ends of which are suitably secured over the tube ends 21 and the upwardly extending ends of the pipes 24 disposed therebeneath. A pipe 27 is connected at its upper end by an elbow coupling 28 to the pipe end 21a and has its opposite end connected by another flexible conduit 26 to the upper end of the other, forward-most exhaust pipe 24.

Each of the tubes or coils 20 is provided with an opposite depending end 29 which is connected to and communicates with a manifold 30 which is disposed in the bottom part of the boiler 11 adjacent one side thereof, as seen in Figure 2, and which is provided with a depending outlet pipe 31 which extends downwardly therefrom along one side of the engine 7. The manifold 30 is closed except for its connection to the tube ends 29 and pipe 31. The pipe 31 forms an exhaust pipe and may open adjacent the bottom of the engine or may extend rearwardly and open behind the truck 6.

A pipe 32 has one end opening into the boiler 11 through the front wall 23 and an opposite depending end which opens into the cavity 17a the engine head 17. A pipe 33 has one end connected to the head 17 and communicating with the cavity 17a, preferably through the frost plug connection at the side of the head opposite to the side thereof on which the exaust pipes 24 are disposed. The opposite end of the pipe 33 opens into the boiler 11 through one of its side walls, which is disposed adjacent the side of the engine head to which the first mentioned end of the pipe or conduit 33 is connected.

A T-coupling 34 has a lower end connected by a short pipe 35 to the top 36 of the boiler and which pipe 35 opens into the boiler 11. The opposite upwardly opening end of the coupling 34 is connected to the lower end of an upstanding pipe 37a. A steam pressure gauge 37 is connected to the upper end of the pipe 37a for indicating the steam pressure in the boiler 11. A pipe 38 leads forwardly from the other, horizontal connection of the T-coupling 34 for a purpose which will hereinafter become apparent. A thermometer 39 is connected to the top 36 of the boiler 11 to indicate the water temperature therein. The boiler 11 is provided with a blowoff valve 40 likewise connected to its top 36 to automatically release the steam pressure therein in the event that excessive pressure is built up. The top 36 is also provided with a filling opening normally closed by a removable plug 41 which is preferably threadedly connected. One of the side walls of the boiler 11 is provided with a vertically disposed sight glass 42 for indicating the water level in the boiler 11.

The engine 7 is connected in a conventional manner by a bottom hose conduit 43 to the bottom of the radiator 8. The top of the radiator 8 is connected by a top hose conduit 44 to the front end of the engine block 45 below and adjacent the engine head 17. The water pump may be dispensed with since the radiator 8 is employed only to cool the engine block 45 and not the head 17, as will hereinafter become apparent.

The pipe 38 extends forwardly from the T-coupling 34 and thence downwardly in front of the radiator 8 and is connected at its discharge end to a conventional double acting steam engine 46. The steam engine 46 is supported on a shelf 47 which is secured to the front axle 9 and disposed directly in front of the radiator 8. A bearing 48, fixed to the shelf 47 journals a shaft 49 to which is fixed a flywheel 50 having an eccentrically disposed crank pin 51. The pin 51 is pivotally connected to one end of a connecting rod 52 and the opposite end of said connecting rod is pivotally connected to the steam engine piston rod 53. An eccentric 54 on the shaft 49 operates the sliding valve rod 55 by which steam is alternately supplied to opposite ends of the cylinder of the steam engine for driving the piston, not shown, first in one direction and then in the opposite direction as is conventional in double acting steam engines. The rear end of the shaft 49 is connected by a universal joint 56 to one end of a short shaft 57. The opposite, rear end of the shaft 57 is connected by a second universal joint 58 to the forward end of the crankshaft 10. Any suitable type of valve 59 is provided in the pipe 38 capable of being operated by a rod 60 which is connected thereto and extends rearwardly into into the truck cab, not shown. The cylinder head cavity 17a is sealed off from the water cavity of the block 45 so that the usual water pump may be dispensed with as the radiator 8 only cools the block 45 and not the head 17.

Figure 4:
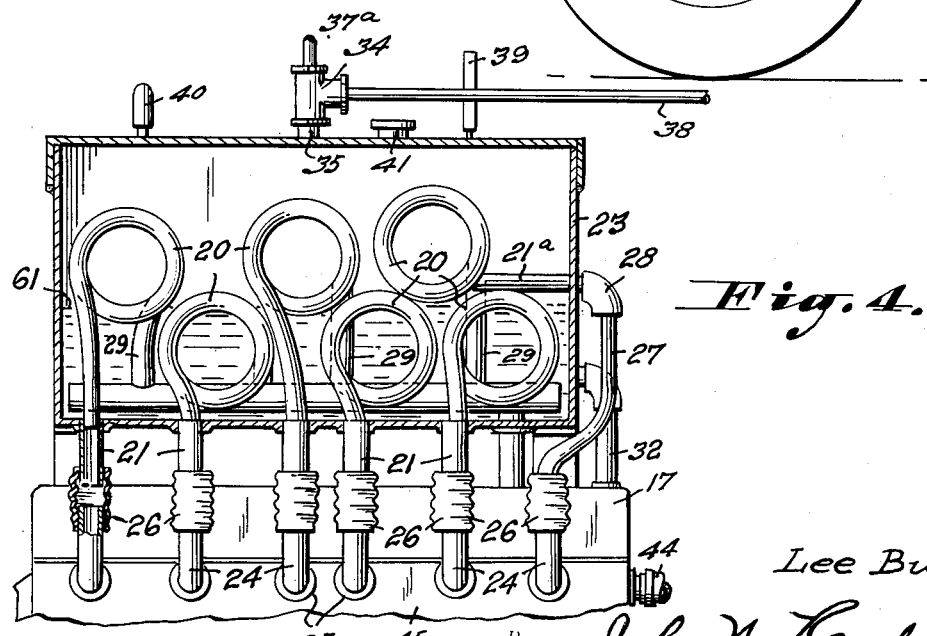
Figure 4 is an enlarged longitudinal sectional view, partly in side elevation showing a portion of the internal combustion engine and a portion of the attachment.

When the internal combustion engine 7 is in operation the exhaust gases will flow through the outlet pipes 24 and 21 and 21a thence through the coils 20. The boiler 11 is substantially filled with water as seen at 61 in Figures 2 and 4 so that the coils 20 are submerged or substantially submerged. The water in the boiler 11 will thus be heated by the heat conduction and radiation from the coils 20 supplied by the exhaust gases passing through said coils. The exhaust gases leave the coils 20 through the tube ends 29, manifold 30 and exhaust pipe 31 and may be discharged to the atmosphere without the use of a muffler. A circulation of water will also exist between the cylinder head cavity 17a and boiler 11 through the conduits 32 and 33. Operation of the internal combustion engine 7 will within a relatively short period of time build up a head of steam in the top portion of the boiler 11 having a pressure in excess of one hundred pounds which is sufficient to operate the steam engine 46. Accordingly, when a proper steam pressure exists in the boiler 11 as indicated on the gauge 37 the truck driver when pulling a grade may actuate the valve 59 by the actuating rod 60 for opening said valve to release the steam from the boiler 11 to the steam engine 46 so that the shaft 49 will be driven by the steam engine to thereby augment the torque supplied to the crankshaft 10 by the internal combustion engine 7. This additional torque afforded by the auxiliary power source 46 will enable the truck 6 to pull grades at higher speeds and without shifting thereby saving considerable traveling time in that it will eliminate the necessity of a truck creeping up grades in low gear. Additionally, fuel consumption of the engine 7 will be substantially reduced as the steam engine 46 will provide additional power for driving the crankshaft 10 without utilizing additional fuel as the steam for operating the steam engine 46 is generated solely by the heat normally wasted from the engine 7. Obviously, if desired the steam gauge 37 may be disposed at any distance from the boiler 11 and must be disposed in a position to be visible to the truck driver so that the driver will know when a sufficient pressure exists to operate the engine 46 and when possibly an excessive pressure exists so that the steam engine 46 should be operated also on level ground to augment the power supplied by the internal combustion engine and to dissipate an excessive steam pressure.

Various modifications and changes are contemplated and may obviously be resorted to, without departing from the spirit or scope of the invention as hereinafter defined by the appended claims.

I claim as my invention:

1. An auxiliary power source for internal combustion engines comprising a steam engine, means forming a driving connection between the steam engine and an internal combustion engine crankshaft, a boiler adapted to be supported on and disposed above an internal combustion engine, means for filling said boiler with water, a plurality of coiled tubes disposed in the boiler, means connecting corresponding ends of said tubes to the exhaust ports of the internal combustion engine whereby the exhaust gases from the engine will heat the coiled tubes in passing therethrough to produce a head of steam in the boiler, an exhaust pipe connected to the opposite ends of said coiled tubes and leading from the boiler, a conduit having one end opening into the top of the boiler and an opposite end connected to the steam engine, a manually controlled valve interposed in said conduit for regulating the supply of steam to the engine from the boiler, a cylinder head forming a part of the internal combustion engine and having a separate water cavity therein, and conduit means connecting the boiler to the cylinder head cavity for supplying water by gravity from the boiler to the cylinder head cavity and for supplying steam from the cylinder head cavity to the boiler.

2. In combination with an internal combustion engine, a steam boiler secured thereto and supported above the engine, coiled tubes disposed within said boiler having corresponding ends extending therefrom and connected to the exhaust ports of the engine, an exhaust pipe leading from said boiler, the opposite end of each of the tubes being connected to said exhaust pipe for carrying off the exhaust gases from the coiled tubes, means for supplying water to the boiler to submerge or substantially submerge the coiled tubes therein, a conduit opening into the top of the boiler at one end thereof, a steam engine fixedly mounted beyond one end of the internal combustion engine and connected to the opposite, discharge end of said conduit whereby steam generated in the boiler by the exhaust gases passing through the coiled tubes is supplied to the steam engine by said conduit for operating the steam engine, means forming a driving connection between said steam engine and the crankshaft of the internal combustion engine for augmenting the torque applied to the crankshaft by the operation of the internal combustion engine, a cylinder head forming a part of the internal combustion engine and having a separate water cavity therein, and conduit means connecting the boiler to the cylinder head cavity whereby heat generated in the cylinder head from operation of the internal combustion engine will supply steam to the boiler and whereby the cylinder head cavity will be gravity fed with water from said boiler.

3. A dual power source of the character described comprising an internal combustion engine including a cylinder head having a separate water cavity therein, a steam engine mounted adjacent the internal combustion engine, means forming a driving connection between the steam engine and the crank shaft of the internal combustion engine, a boiler secured to and mounted directly above and adjacent the cylinder head, conduit means connecting the otherwise sealed separate cavity of the engine head and the bottom portion of the boiler, said boiler having a filling port in the top thereof for filling the cylinder head cavity and boiler with water, a plurality of coiled tubes disposed in the boiler, means connecting corresponding ends of said tubes to the exhaust ports of the internal combustion engine whereby the exhaust gases from the engine will heat the coiled tubes in passing therethrough to produce a head of steam in the boiler, an exhaust pipe connected to the opposite ends of the coiled tubes and leading from the boiler, and a conduit having one end opening into the top of the boiler and an opposite end connected to the steam engine.

References Cited in the file of this patent

UNITED STATES PATENTS

| | | |
|---|---|---|
| 912,567 | Hess | Feb. 16, 1909 |
| 992,881 | Kitchen | May 23, 1911 |
| 1,373,509 | Killman | Apr. 15, 1921 |
| 1,436,078 | Bell | Nov. 21, 1922 |
| 1,812,277 | Yonkese | June 30, 1931 |
| 1,952,495 | Gatch | Mar. 27, 1934 |

FOREIGN PATENTS

| | | |
|---|---|---|
| 640,177 | France | Mar. 24, 1928 |
| 418,212 | Germany | Aug. 27, 1925 |
| 168,402 | Great Britain | Aug. 31, 1921 |